United States Patent [19]

Saito

[11] Patent Number: 5,754,104

[45] Date of Patent: May 19, 1998

[54] ANTENNA ALARM DETECTION SYSTEM

[75] Inventor: Atsushi Saito, Tokyo, Japan

[73] Assignee: NEC Corporation, Tokyo, Japan

[21] Appl. No.: 741,312

[22] Filed: Oct. 30, 1996

[30] Foreign Application Priority Data

Nov. 10, 1995 [JP] Japan ................... 7-292593

[51] Int. Cl.⁶ ........................................ G08B 1/08

[52] U.S. Cl. ........................ 340/539; 455/13.3; 370/280; 370/435

[58] Field of Search ........................ 455/13.3, 13.4, 455/19.7, 25, 107, 193.1, 279, 101, 115, 117, 129; 343/755; 370/228, 280, 433, 435; 340/539

[56] References Cited

U.S. PATENT DOCUMENTS

| 4,274,156 | 6/1981 | Trefney ............... | 455/115 |
|---|---|---|---|
| 4,823,280 | 4/1989 | Mailandt et al. ........ | 455/115 |
| 5,542,104 | 7/1996 | Ozawa et al. .......... | 455/89 |

FOREIGN PATENT DOCUMENTS

| 64-60027 | 3/1989 | Japan . |
|---|---|---|
| 2 294 378 | 4/1996 | United Kingdom . |

*Primary Examiner*—Thomas J. Mullen, Jr.
*Assistant Examiner*—Daryl C. Pope
*Attorney, Agent, or Firm*—Young & Thompson

[57] ABSTRACT

An antenna alarm detection system includes first and second antennas, a transmission section, an antenna switch section, a reflected power detection section, and a comparing section. The transmission section transmits a control signal and speech communication information. The antenna switch section alternately switches and outputs the control signal transmitted from the transmission section to the first and second antennas in a predetermined cycle in a non-speech communication state in which only the control signal is transmitted. The reflected power detection section detects the reflected power of each of transmission signals from the first and second antennas. The comparing section compares the detected reflected power with a predetermined reference value, and outputs an alarm signal on the basis of the comparison result.

9 Claims, 7 Drawing Sheets

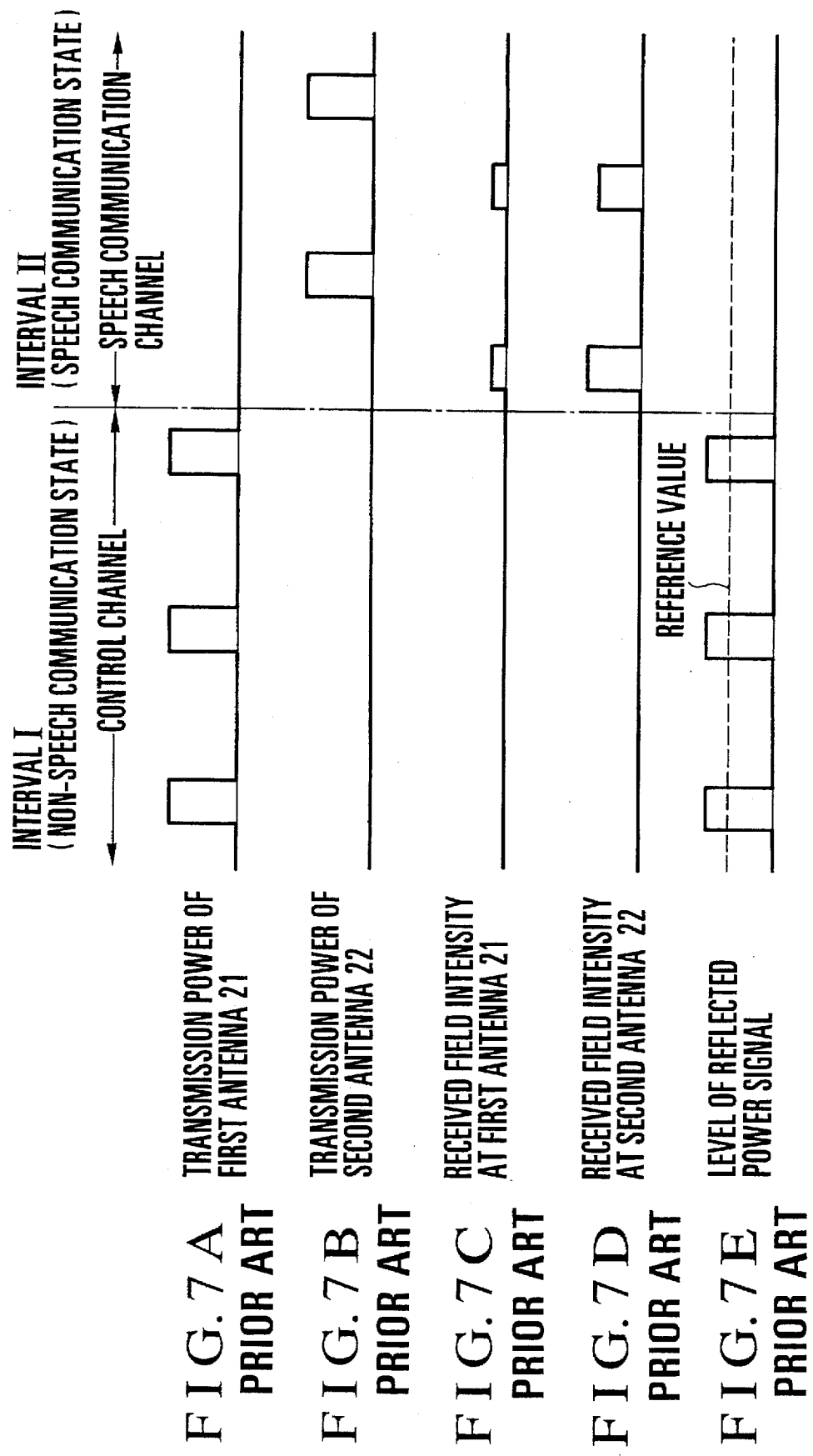

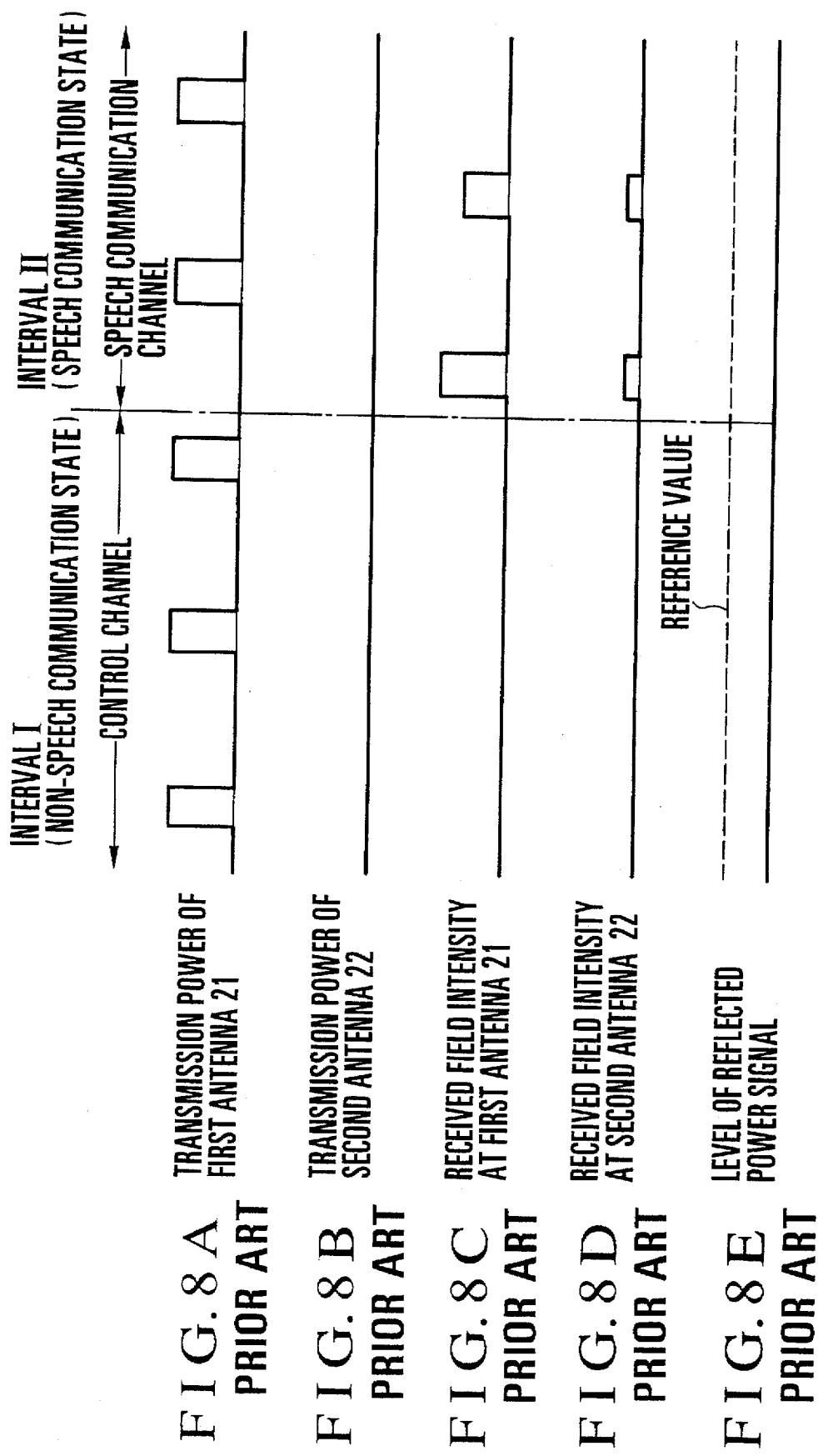

ANTENNA ALARM DETECTION SYSTEM

BACKGROUND OF THE INVENTION

1. Field of the Invention

The present invention relates to an antenna alarm detection system and, more particularly, to an antenna alarm detection system for a TDD (Time Division Duplex)-TDMA (Time Division Multiple Access) transmission/reception apparatus.

2. Description of the Related Art

A radio communication apparatus for microwave radio communication or the like is designed to receive radio waves from a space diversity reception system by using two antennas, i.e., a main antenna and a sub-antenna, and perform transmission through the main antenna also serving as a transmitting antenna. This apparatus requires an antenna switching system for switching the main antenna when an abnormality occurs. As disclosed in Japanese Patent Laid-Open No. 64-60027, a conventional antenna switching system has a reflected wave detection circuit connected to a main antenna transmission line to switch the transmitting antenna from the main antenna to the sub-antenna when the quantity of reflected waves exceeds a predetermined value.

FIG. 4 shows the principle of the antenna switching system disclosed in Japanese Patent Laid-Open No. 64-60027. This antenna switching system is designed to receive radio waves from a space diversity reception system by using two antennas, i.e., a main antenna 1 and a sub-antenna 6, and transmit radio waves through the main antenna 1 also serving as a transmitting antenna. In this radio communication apparatus, a reflected wave detection circuit 10 for detecting the reflected wave of a transmission signal output from a transmitter 5 to the main antenna 1 is connected to a transmission line 2 of the main antenna 1. When the quantity of detected reflected waves exceeds a predetermined value, the reflected wave detection circuit 10 controls a switching control circuit 13 to make transmission line switching circuits 11 and 12 operate so as to automatically switch the transmitting antenna from the main antenna 1 to the sub-antenna 6. Reference numeral 3 denotes an antenna duplexer; 4, a main receiver; 7, a transmission line used for reception in a normal state and used for transmission/reception in an abnormal state; 8, a circulator; and 9, a sub-receiver.

This antenna switching system is an alarm detection system used for a space diversity system dedicated to reception, and designed to perform abnormality detection for only the main antenna.

In an antenna alarm detection system for a TDD-TDMA transmission/reception apparatus for antenna switching diversity, a coupling section constituted by a coupler, a circulator, or the like is arranged between an antenna switch section and a transmission section to detect reflected power from an antenna. When this detected reflected power exceeds a predetermined value, it is determined that an abnormality has occurred at the antenna, and an alarm signal is output.

FIG. 5 shows the principle of the antenna alarm detection system for this TDD-TDMA transmission/reception apparatus. Referring to FIG. 5, reference numeral 21 denotes a 0-system antenna (first antenna); 22, a 1-system antenna (second antenna); 23, an antenna switch section; 24, a 0-system reception section (first reception section); 25, a 1-system reception section (second reception section); 26, a coupling section constituted by a coupler, a circulator, or the like; 27, a transmission section; 28, a reflected power detection section; and 29, a radio control section.

This TDD-TDMA transmission/reception apparatus repeatedly performs transmission/reception by using time slots like those shown in FIG. 6. Referring to FIG. 6, when, for example, reception is performed by using a time slot R2 in a speech communication state, transmission is performed by using a next time slot T2. In this case, one of the antennas which exhibits the higher received field intensity upon reception through the reception time slot R2 is used as a transmitting antenna. In a non-speech communication state, for example, control information is transmitted by using a time slot T0. However, since no reception signal is present, transmission is performed through a fixed antenna system, e.g., the first antenna 21, without performing antenna selection based on received field intensities as in a speech communication state. [When Abnormality Has Occurred at First Antenna 21]

FIGS. 7A to 7E show the waveforms at the respective portions when an abnormality has occurred at the first antenna 21. FIG. 7A shows the transmission power of the first antenna 21. FIG. 7B shows the transmission power of the second antenna 22. FIG. 7C shows the received field intensity at the first antenna 21. FIG. 7D shows the received field intensity at the second antenna 22. FIG. 7E shows the level of a reflected power signal at the reflected power detection section 28. Note that an interval I indicates that the apparatus is not in a speech communication state (non-speech communication state), and an interval II indicates that the apparatus is in a speech communication state. Interval I (non-speech communication state):

First of all, the radio control section 29 controls the antenna switch section 23 to switch the transmission system to the first antenna 21 side, and transmits a control signal from the transmission section 27 through the coupling section 26, the antenna switch section 23, and the first antenna 21 (FIG. 7A). At this time, since an abnormality has occurred at the first antenna 21, the transmission signal is reflected by the first antenna 21 and input to the reflected power detection section 28 through the antenna switch section 23 and the coupling section 26. The reflected power detection section 28 detects the reflected power of the input transmission signal and supplies a reflected power signal based on a voltage signal to the radio control section 29. The radio control section 29 compares the level of the reflected power signal from the reflected power detection section 28 with a predetermined reference value. In this case, since the abnormality has occurred at the first antenna 21, the level of the reflected power signal is higher than the reference value (FIG. 7E), and the radio control section 29 outputs an alarm signal.

Interval II (speech communication state):

The radio control section 29 compares the received field intensity of a reception signal input from the first antenna 21 to the first reception section 24 through the antenna switch section 23 with the received field intensity of a reception signal input from the second antenna 22 to the second reception section 25 through the antenna switch section 23. At this time, since the abnormality has occurred at the first antenna 21, the received field intensity of the reception signal input to the second reception section 25 is higher than that of the reception signal input to the first reception section 24 (FIGS. 7C and 7D). For this reason, the radio control section 29 controls the antenna switch section 23 to switch the transmission system to one of the antennas which exhibits the higher received field intensity, i.e., the second antenna 22, and transmits speech communication information from the transmission section 27 through the coupling section 26, the antenna switch section 23, and the second antenna 22 (FIG. 7B).

[When Abnormality Has Occurred at Second Antenna 22]

FIGS. 8A to 8E show the waveforms at the respective portions when an abnormality has occurred at the second antenna 22. FIG. 8A shows the transmission power of the first antenna 21. FIG. 8B shows the transmission power of the second antenna 22. FIG. 8C shows the received field intensity at the first antenna 21. FIG. 8D shows the received field intensity at the second antenna 22. FIG. 8E shows the level of the reflected power signal at the reflected power detection section 28. Note that an interval I indicates that the apparatus is not in a speech communication state (non-speech communication state), and an interval II indicates that the apparatus is in a speech communication state.

Interval I (non-speech communication state):

The radio control section 29 controls the antenna switch section 23 to switch the transmission system to the first antenna 21 side to transmit a control signal from the transmission section 27 through the coupling section 26, the antenna switch section 23, and the first antenna 21 (FIG. 8A). At this time, since the first antenna 21 is in a normal state, the level of a reflected power signal at the reflected power detection section 28 is not higher than the reference value (FIG. 8E), and no alarm signal is output.

Interval II (speech communication state):

The radio control section 29 compares the received field intensity of a reception signal input from the first antenna 21 to the first reception section 24 through the antenna switch section 23 with the received field intensity of a reception signal input from the second antenna 22 to the second reception section 25 through the antenna switch section 23. At this time, since an abnormality has occurred at the second antenna 22, the received field intensity of the reception signal input to the first reception section 24 is higher than that of the reception signal input to the second reception section 25 (FIGS. 8C and 8D). For this reason, the radio control section 29 controls the antenna switch section 23 to switch the transmission system to one of the antennas which exhibits the higher received field intensity, i.e., the first antenna 21, and transmits speech communication information from the transmission section 27 through the coupling section 26, the antenna switch section 23, and the first antenna 21. For this reason, no transmission signal is output from the second antenna 22 (FIG. 8B).

In this conventional antenna alarm detection system, when the first antenna 21 is in an abnormal state, since an alarm signal is output from the radio control section 29, this state can be detected. If, however, when the second antenna 22 is in an abnormal state, only transmission of speech communication information is performed through the first antenna 21, but the abnormal state of the second antenna 22 cannot be detected.

As described above, in the conventional antenna alarm detection system for the TDD-TDMA transmission/reception apparatus which performs antenna switching diversity processing, when an abnormality has occurred at one antenna (first antenna) for transmitting control information in a non-speech communication state, the abnormality is detected, and an alarm signal is output. When, however, an abnormality has occurred at the other antenna (second antenna), the abnormality cannot be detected.

SUMMARY OF THE INVENTION

It is an object of the present invention to provide an antenna alarm detection system which detects an abnormality at the second antenna as well as an abnormality at the first antenna to improve maintainability.

In order to achieve the above object, according to the present invention, there is provided an antenna alarm detection system comprising first and second antennas, transmission means for transmitting a control signal and speech communication information, switching means for alternately switching and outputting the control signal transmitted from the transmission means to the first and second antennas in a predetermined cycle in a non-speech communication state in which only the control signal is transmitted, detection means for detecting reflected power of each of transmission signals from the first and second antennas, and alarm output means for comparing the detected reflected power with a predetermined reference value, and outputting an alarm signal on the basis of the comparison result.

BRIEF DESCRIPTION OF THE DRAWINGS

FIGS. 7A to 7E are timing charts showing the waveforms at the respective portions when a first antenna is in an abnormal state in the transmission/reception apparatus in FIG. 5; and FIGS. 8A to 8E are timing charts showing the waveforms at the respective portions when a second antenna is in an abnormal state in the transmission/reception apparatus in FIG. 5.

DESCRIPTION OF THE PREFERRED EMBODIMENTS

The present invention will be described in detail below with reference to the accompanying drawings.

Figure 1:
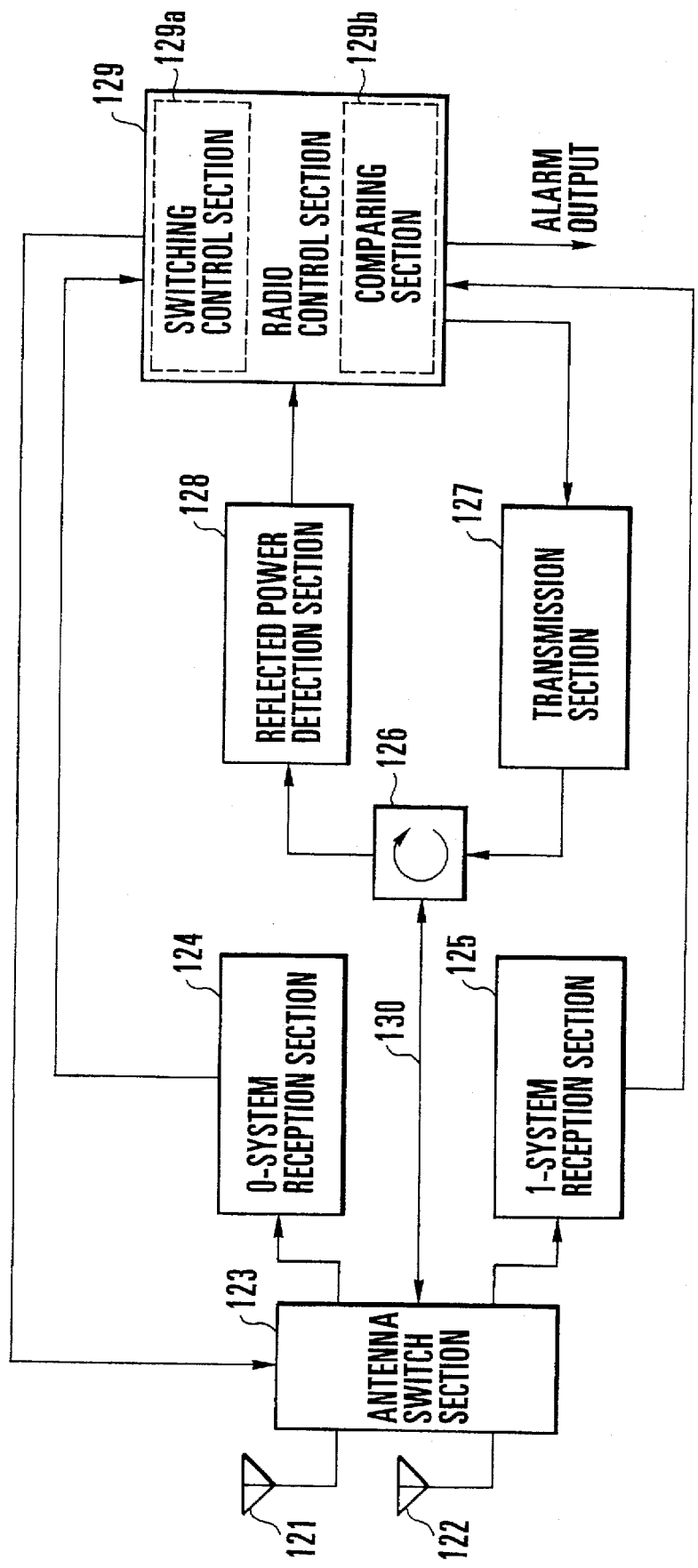
FIG. 1 is a block diagram showing a TDD-TDMA transmission/reception apparatus according to an embodiment of the present invention.

FIG. 1 shows an antenna alarm detection system for a TDD-TDMA transmission/reception apparatus according to an embodiment of the present invention. Referring to FIG. 1, reference numeral 121 denotes a 0-system antenna (first antenna) serving as both transmitting and receiving antennas; 122, a 1-system antenna (second antenna) serving as a dedicated receiving antenna in a normal state but serving as both transmitting and receiving antennas in an abnormal state; 123, an antenna switch section for connecting the first and second antennas 121 and 122 to 0- and 1-system reception systems, respectively, and for switching/connecting a transmission system to the first and second antennas 121 and 122; 124, a 0-system reception section (first reception section) constituting the 0-system reception system; 125, a 1-system reception section (second reception section) constituting the 1-system reception system; 126, a coupling section such as a coupler or circulator which is connected to the antenna switch section 123 through a bidirectional signal line 130 to perform two-wire to four-wire conversion; 127, a transmission section for outputting a transmission signal to the antenna switch section 123 through the coupling section 126 and the bidirectional signal line 130; 128, a reflected power detection section for detecting the reflected power of a transmission signal input through the bidirectional signal line 130 and the coupling section 126; and 129, a radio control section for performing transmission/reception control based on TDD-TDMA. The radio control section 129 includes a comparing section 129b serving as an alarm output means for comparing an output from the reflected power detection section 128 with a reference value to output an alarm signal, and a switching control section 129a for controlling the antenna switch section 123 on the basis of outputs from the first and second reception sections 124 and 125.

The antenna alarm detection system having the above arrangement will be described next, together with the function of the radio control section 129.

[When Abnormality Has Occurred at First Antenna 121]

Figure 2:
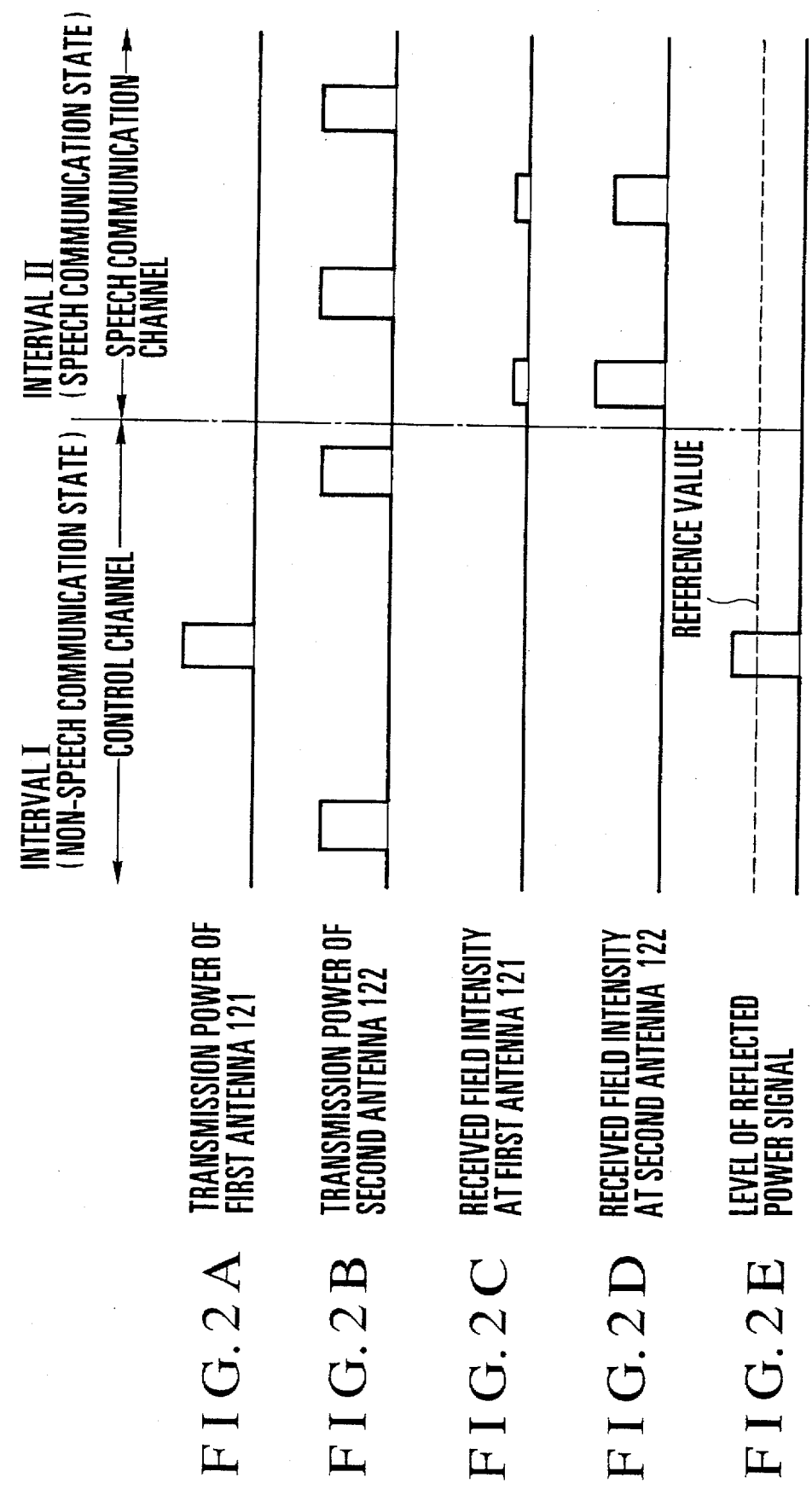
FIGS. 2A to 2E are timing charts showing the waveforms at the respective portions when a first antenna is in an abnormal state in the transmission/reception apparatus in FIG. 1.

FIGS. 2A to 2E show the waveforms at the respective portions when an abnormality has occurred at the first antenna 121. FIG. 2A shows the transmission power of the first antenna 121. FIG. 2B shows the transmission power of the second antenna 122. FIG. 2C shows the received field intensity at the first antenna 121. FIG. 2D shows the received field intensity at the second antenna 122. FIG. 2E shows the level of a reflected power signal at the reflected power detection section 128. Note that an interval I indicates that the apparatus is not in a speech communication state (non-speech communication state), and an interval II indicates that the apparatus is in a speech communication state.

Interval I (non-speech communication state):

The switching control section 129a of the radio control section 129 controls the antenna switch section 123 to alternately switch the transmission system to the first antenna 121 side and the second antenna 122 side in a predetermined cycle. With this operation, the transmission section 127 transmits a control signal through the coupling section 126, the bidirectional signal line 130, the antenna switch section 123, and the first and second antennas 121 and 122.

Switching to Second Antenna 122 Side:

The switching control section 129a of the radio control section 129 controls the antenna switch section 123 to switch the transmission system to the second antenna 122 side so as to transmit a control signal from the transmission section 127 through the coupling section 126, the bidirectional signal line 130, the antenna switch section 123, and the second antenna 122 (FIG. 2B). At this time, the transmission signal is reflected by the second antenna 122 and input to the reflected power detection section 128 through the bidirectional signal line 130 and the coupling section 126. The reflected power detection section 128 detects the reflected power of the input transmission signal and supplies a reflected power signal constituted by a voltage signal to the radio control section 129. The comparing section 129b of the radio control section 129 compares the level of the reflected power signal from the reflected power detection section 28 with a predetermined reference value. In this case, since the second antenna 122 is in a normal state, the level of the reflected power signal is sufficiently lower than the reference value (FIG. 2E), and the comparing section 129b outputs no alarm signal.

Switching to First Antenna 121 Side:

The switching control section 129a of the radio control section 129 controls the antenna switch section 123 to switch the transmission system to the first antenna 121 side so as to transmit a control signal from the transmission section 127 through the coupling section 126, the bidirectional signal line 130, the antenna switch section 123, and the first antenna 121 (FIG. 2A). At this time, the transmission signal is reflected by the first antenna 121 and input to the reflected power detection section 128 through the bidirectional signal line 130 and the coupling section 126. The reflected power detection section 128 detects the reflected power of the input transmission signal and outputs a reflected power signal constituted by a voltage signal to the radio control section 129. The comparing section 129b of the radio control section 129 compares the level of the reflected power signal from the reflected power detection section 128 with a predetermined reference value. In this case, since the first antenna 121 is in an abnormal state, the level of the reflected power signal is higher than the reference value (FIG. 2E), and the comparing section 129b outputs an alarm signal.

Interval II (speech communication state):

The comparing section 129b of the radio control section 129 compares the received field intensity of a reception signal input from the first antenna 121 to the first reception section 124 through the antenna switch section 123 with the received field intensity of a reception signal input from the second antenna 122 to the second reception section 125 through the antenna switch section 123. At this time, since the first antenna 121 is in an abnormal state, the received field intensity of the reception signal input to the second reception section 125 is higher than that of the reception signal input to the first reception section 124 (FIGS. 2C and 2D). With this operation, the switching control section 129a of the radio control section 129 controls the antenna switch section 123 to switch the transmission system to one of the antenna sides which exhibits the higher received field intensity, i.e., the second antenna 122 side, thereby transmitting speech communication information from the transmission section 127 through the coupling section 126, the bidirectional signal line 130, the antenna switch section 123, and the second antenna 122 (FIG. 2B).

[When Abnormality Has Occurred at Second Antenna 122]

Figure 3:
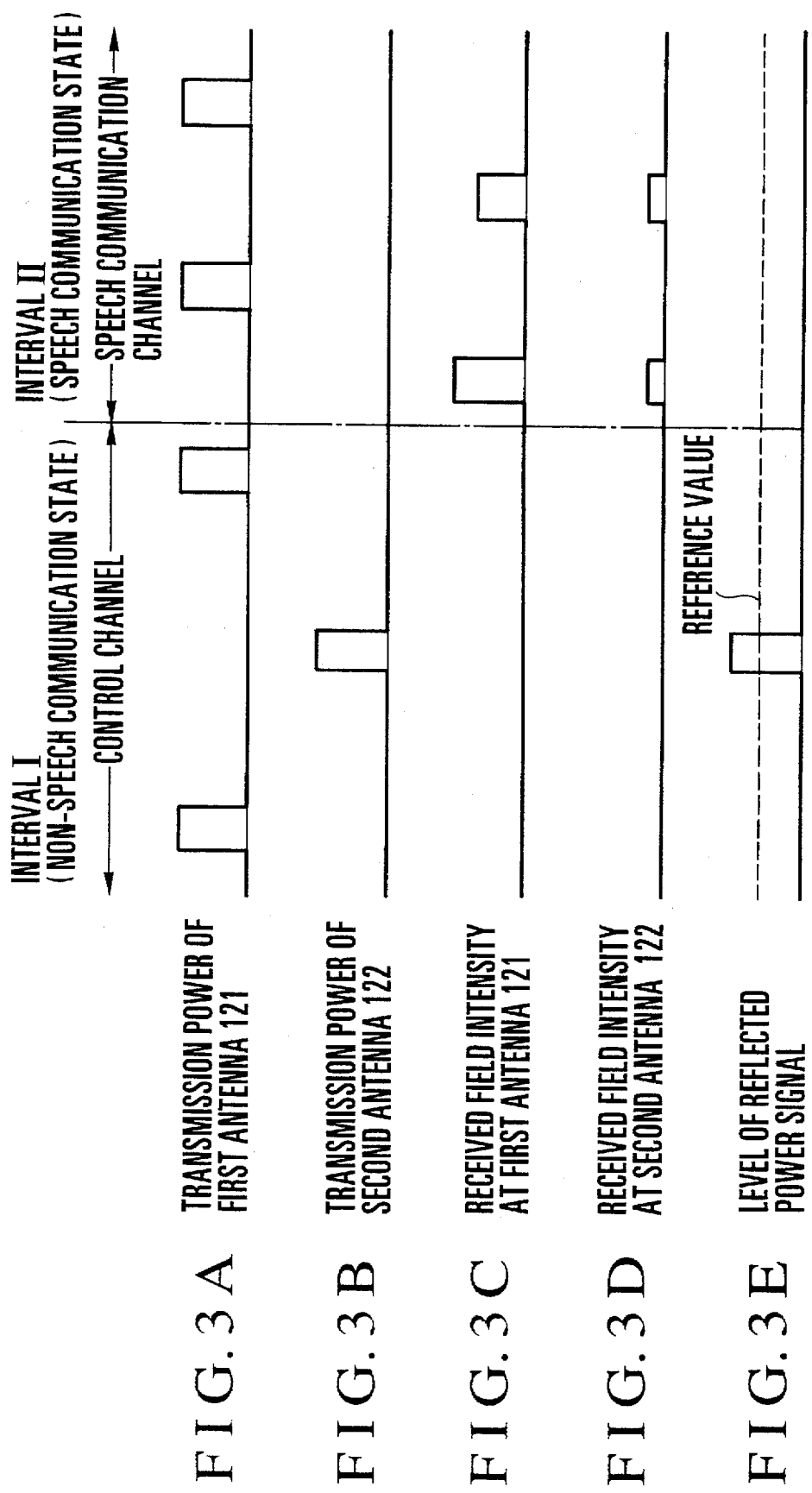
FIGS. 3A to 3E are timing charts showing the waveforms at the respective portions when said second antenna is in an abnormal state in said transmission/reception apparatus in FIG. 1.
Figure 4:
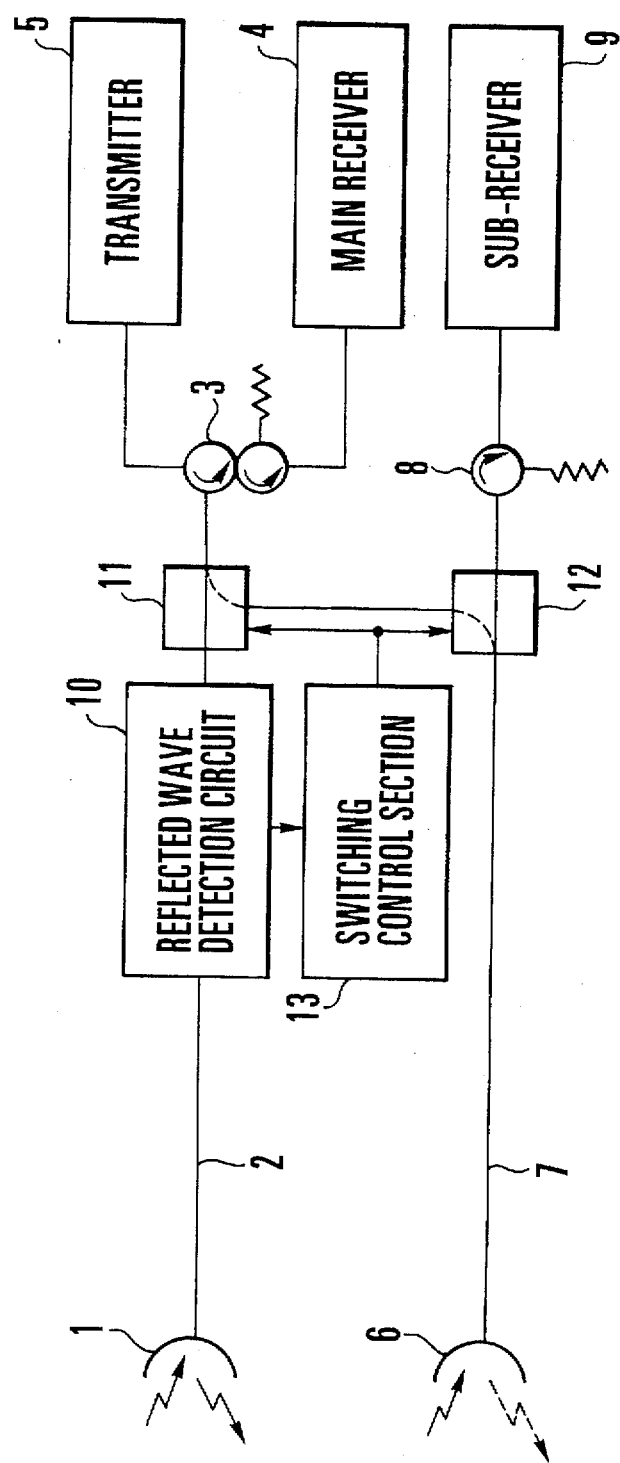
FIG. 4 is a block diagram showing a conventional antenna switching system.
Figure 5:
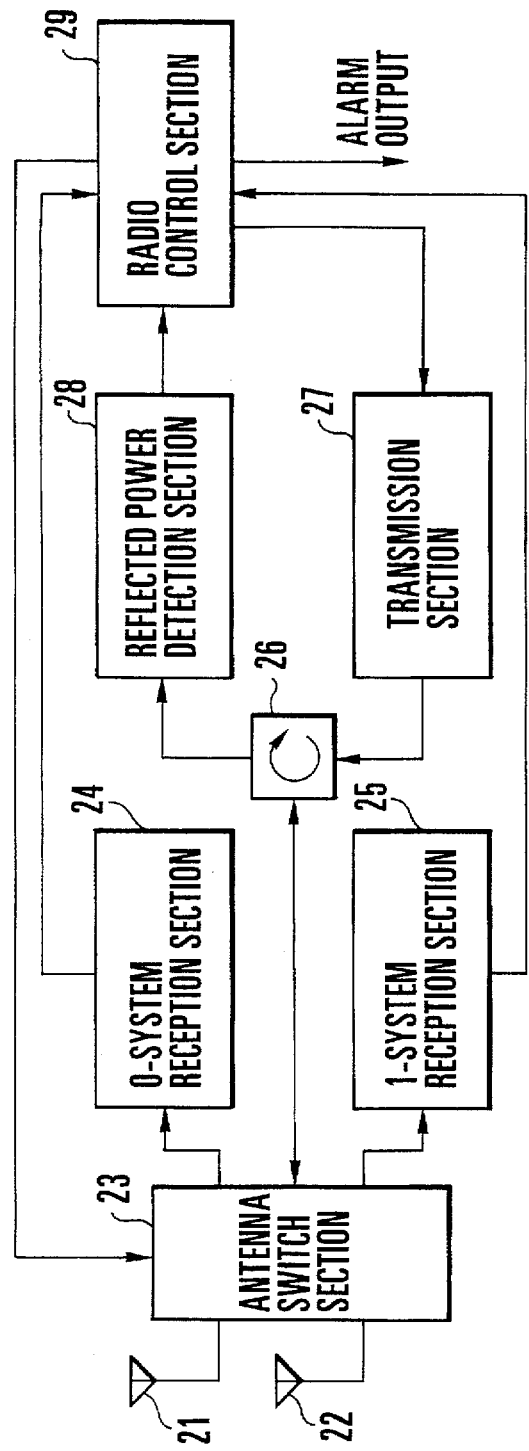
FIG. 5 is a block diagram showing an antenna alarm detection system for a conventional TDD-TDMA transmission/reception apparatus.
Figure 6:
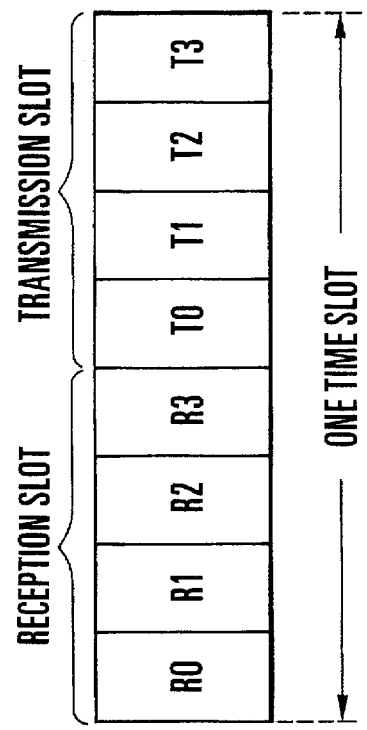
FIG. 6 is a view showing signal time slots for the transmission/reception apparatus in FIG. 5.

FIGS. 3A to 3E show the waveforms at the respective portions when an abnormality has occurred at the second antenna 122. FIG. 3A shows the transmission power of the first antenna 121. FIG. 3B shows the transmission power of the second antenna 122. FIG. 3C shows the received field intensity at the first antenna 121. FIG. 3D shows the received field intensity at the second antenna 122. FIG. 3E shows the level of a reflected power signal at the reflected power detection section 128. Note that an interval I indicates that the apparatus is not in a speech communication state (non-speech communication state), and an interval II indicates that the apparatus is in a speech communication state.

Interval I (non-speech communication state):

The switching control section 129a of the radio control section 129 controls the antenna switch section 123 to alternately switch the transmission system to the first antenna 121 side and the second antenna 122 side in a predetermined cycle. With this operation, the transmission section 127 transmits a control signal through the coupling section 126, the bidirectional signal line 130, the antenna switch section 123, and the first and second antennas 121 and 122.

Switching to First Antenna 121 Side:

The switching control section 129a of the radio control section 129 controls the antenna switch section 123 to switch the transmission system to the first antenna 121 side so as to transmit a control signal from the transmission section 127 through the coupling section 126, the bidirectional signal line 130, the antenna switch section 123, and the first antenna 121 (FIG. 3A). At this time, the transmission signal is reflected by the first antenna 121 and input to the reflected power detection section 128 through the bidirectional signal line 130 and the coupling section 126. The reflected power detection section 128 detects the reflected power of the input transmission signal and outputs a reflected power signal constituted by a voltage signal to the radio control section 129. The comparing section 129b of the radio control section 129 compares the level of the reflected power signal from the reflected power detection section 128 with a predetermined reference value. In this case, since the first antenna 121 is in a normal state, the level of the reflected power signal is sufficiently lower than the reference value (FIG. 3E), and the comparing section 129b outputs no alarm signal.

Switching to Second Antenna 122 Side:

The switching control section 129a of the radio control section 129 controls the antenna switch section 123 to switch the transmission system to the second antenna 122 side so as to transmit a control signal from the transmission section 127 through the coupling section 126, the bidirectional signal line 130, the antenna switch section 123, and the second antenna 122 (FIG. 3B). At this time, the transmission signal is reflected by the second antenna 122 and input to the reflected power detection section 128 through the bidirectional signal line 130 and the coupling section 126. The reflected power detection section 128 detects the reflected power of the input transmission signal and outputs a reflected power signal constituted by a voltage signal to the radio control section 129. The comparing section 129b of the radio control section 129 compares the level of the reflected power signal from the reflected power detection section 128 with a predetermined reference value. In this case, since the second antenna 122 is in an abnormal state, the level of the reflected power signal is higher than the reference value (FIG. 3E), and the comparing section 129b outputs an alarm signal.

Interval II (speech communication state):

The comparing section 129b of the radio control section 129 compares the received field intensity of a reception signal input from the first antenna 121 to the first reception section 124 through the antenna switch section 123 with the received field intensity of a reception signal input from the second antenna 122 to the second reception section 125 through the antenna switch section 123. At this time, since the second antenna 122 is in an abnormal state, the received field intensity of the reception signal input to the first reception section 124 is higher (FIGS. 3C and 3D). With this operation, the switching control section 129a of the radio control section 129 controls the antenna switch section 123 to switch the transmission system to one of the antenna sides which exhibits the higher received field intensity, i.e., the first antenna 121 side, thereby transmitting speech communication information from the transmission section 127 through the coupling section 126, the bidirectional signal line 130, the antenna switch section 123, and the first antenna 121 (FIG. 3A).

As has been described above, according to the present invention, in a non-speech communication state, the antenna for transmitting a control signal is alternately switched between the first and second antennas, and an alarm signal is output when the reflected power of the transmission signal from the first or second antenna is larger than a reference value. Therefore, abnormalities at both the first and second antennas can be detected, and maintenance can be performed before the two antennas fail, thus improving the maintainability.

What is claimed is:

1. An antenna alarm detection system comprising:

first and second antennas;

transmission means for transmitting a control signal and speech communication information;

switching means for alternately switching and outputting the control signal transmitted from said transmission means to said first and second antennas in a predetermined cycle in a non-speech communication state in which only the control signal is transmitted;

detection means for detecting reflected power of each of transmission signals from said first and second antennas; and alarm output means for comparing the detected reflected power with a predetermined reference value, and outputting an alarm signal on the basis of the comparison result.

2. A system according to claim 1, wherein said alarm output means outputs an alarm signal when the detected reflected power is larger than the predetermined reference value.

3. A system according to claim 1, further comprising control means for, in a speech communication state in which speech communication information is transmitted/received, comparing a received field intensity of a reception signal input through said first antenna with a reflected field intensity of a reception signal input through said second antenna, and controlling said switching means to switch said transmission means to one of said first and second antennas which exhibits a higher received field intensity, and wherein said transmission means transmits speech communication information in one of said first and second antennas to which said transmission means is switched.

4. A system according to claim 3, wherein said switching control means controls said switching means to alternately switch said transmission means to said first and second antennas in a predetermined cycle when a non-speech communication state is set.

5. A system according to claim 3, further comprising radio control means for controlling transmission/reception based on TDD-TDMA, said radio control means controlling a transmitting operation of said transmission means after switching said switching means upon a receiving operation.

6. A system according to claim 1, further comprising:

first and second reception means for receiving reception signals output from said first and second antennas; and coupling means for outputting a transmission signal from said transmission means through a bidirectional signal line, and outputting reflected signals of transmission signals sent from said first and second antennas through said bidirectional signal line to said detection means, and wherein said switching means connects said coupling means to one of said first and second antennas through said bidirectional signal line.

7. An antenna alarm detection system comprising:

first and second antennas;

transmission means for transmitting a control signal and speech communication information;

switching means for alternately switching and outputting the control signal transmitted from said transmission means to said first and second antennas in a predetermined cycle in a non-speech communication state in which only the control signal is transmitted;

detection means for detecting reflected power of each of transmission signals from said first and second antennas;

alarm output means for comparing the detected reflected power with a predetermined reference value, and outputting an alarm signal when the detected reflected power is larger than the predetermined reference value; and first and second reception means for receiving reception signals output from said first and second antennas; and coupling means for outputting a transmission signal from said transmission means through a bidirectional signal line, and outputting reflected signals of transmission signal sent from said first and second antennas through said bidirectional signal line to said detection means; and control means for, in a speech communication state in which speech communication information is transmitted/received, comparing a received field intensity of a reception signal input through said first antenna with a reflected field intensity of a reception signal input through said second antenna, and controlling said switching means to switch said transmission means to one of said first and second antennas which exhibits a higher received field intensity;

wherein said transmission means transmits speech communication information one of said first and second antennas to which said transmission means is switched; and wherein said switching means connects said coupling means to one of said first and second antennas through said bidirectional signal line.

8. A system according to claim 7, wherein said switching control means controls said switching means to alternately switch said transmission means to said first and second antennas in a predetermined cycle when a non-speech communication state is set.

9. A system according to claim 7, further comprising radio control means for controlling transmission/reception based on TDD-TDMA, said radio control means controlling a transmitting operation of said transmission means after switching said switching means upon a receiving operation.

* * * * *